April 16, 1968   D. J. PETRANEK   3,377,817
DEFROST CONTROL FOR HEATING AND COOLING REFRIGERATION SYSTEMS
Filed Dec. 27, 1966   2 Sheets-Sheet 1

INVENTOR.
DAVID J. PETRANEK
BY Carl M. Lewis
ATTORNEY

April 16, 1968    D. J. PETRANEK    3,377,817
DEFROST CONTROL FOR HEATING AND COOLING REFRIGERATION SYSTEMS
Filed Dec. 27, 1966    2 Sheets-Sheet 2
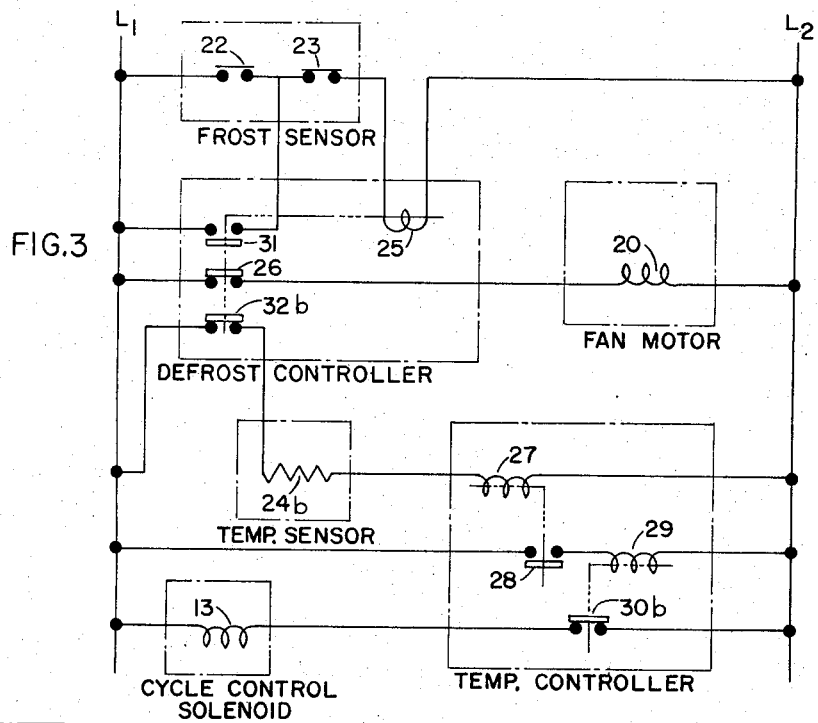
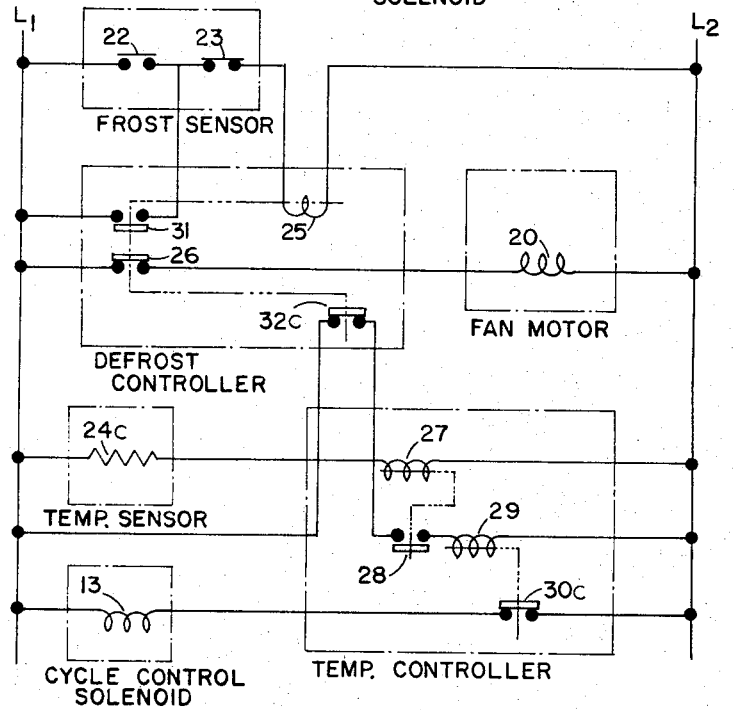
INVENTOR.
DAVID J. PETRANEK
BY *Carl M. Lewis*
ATTORNEY United States Patent Office 3,377,817
Patented Apr. 16, 1968

3,377,817
DEFROST CONTROL FOR HEATING AND COOLING REFRIGERATION SYSTEMS
David J. Petranek, La Crosse, Wis., assignor to The Trane Company, La Crosse Wis., a corporation of Wisconsin
Filed Dec. 27, 1966, Ser. No. 604,678
8 Claims. (Cl. 62—140)

ABSTRACT OF THE DISCLOSURE

A refrigeration system operable in both heating and cooling modes or cycles and having a cycle control valve operated to the heat cycle position in response to an electric control signal and operated to a cooling cycle position in the absence of the control signal whereby said valve assumes the cooling position upon failure of said signal, a temperature responsive control for producing said control signal when heating is required, and a defrost control which utilizes the signal producing elements of the temperature control to actuate the cycle control valve to the heating cycle position.

Background of the invention

It is known to utilize a control valve to operate a refrigeration system for both heating and cooling. Many of these refrigeration systems such as those employed on trucks and rail cars for conditioning the cargo space operate a far greater portion of the time on the cooling cycle. Further failure of the cooling cycle is normally more deleterious to the cargo than failure of the heating cycle. It is therefore advantageous that the system automatically assume a cooling cycle in the event of failure in the control system. The control signal for purposes of heating is normally provided by a delicate temperature controller responsive to the temperature of the conditioned space. The temperature controller may also control the speed of operation of the compressor on one or both of the heating and cooling cycles. The temperature controller may employ solid state circuitry which may be easily damaged by feed-back signals.

In systems of this type it is normal practice to defrost the heat exchanger associated with the cargo space by applying a control signal to the cycle control valve to cause it to move to the heating position. This signal is derived from a source other than the temperature controller. In other words the defrost control overrides the temperature controller which is normally in the cooling position when defrosting is required. This is normally done by providing the defrost relay with a contact which sends a signal to the cycle control valve when defrost is required. However, to prevent the possibility of this signal feeding back into the temperature controller it is desirable to place an additional contact on the defrost relay which disconnects the temperature controller from the cycle control valve circuit. This increases the cost and introduces another reliability problem.

Summary of the invention

The instant invention teaches how the temperature controller itself may be used to produce the control signal for purposes of defrost, thereby eliminating the extra contact on the defrost relay, reducing the cost, and increasing the reliability. Further, the inventive concept is particularly adaptable to systems which utilize electronic temperature controllers and electronic detection of frost accumulation. Thus the weak signal from the electronic frost detector may be amplified by the components of the temperature controller thereby eliminating many components and reducing the cost and increasing the reliability of the control. More specifically, the instant invention involves a refrigeration system operable in cooling and heating cycles to selectively cool and heat a conditioned space comprising a refrigerant compressor, a first refrigerant gas line, a first heat exchanger, a refrigerant liquid line including refrigerant throttling means, a second heat exchanger, and a second refrigerant gas line respectively serially connected in a closed refrigerant circuit; fan means for passing air from said conditioned space in heat exchange relation with said second heat exchanger; valve means having a first position for delivering liquid refrigerant to said second heat exchanger and a second position for delivering hot gaseous refrigerant to said second heat exchanger for respectively operating said refrigeration system on a cooling cycle and a heating cycle; an electromagnetic operator means drivingly connected to said valve means for moving said valve means to said second position upon receiving an electric control signal; frost sensor means for sensing the presence of frost on said second heat exchanger; temperature sensor means for sensing the temperature of said conditioned space; temperature controlled means responsive to said temperature sensor means for selecting the heating cycle of operation if the temperature sensed passes below a predetermined value and the cooling cycle of operation if the temperature sensed passes above a predetermined value and for producing and sending an electric control signal to said electromagnetic operator means when the heating cycle of operation is selected; defrost control means operable during the cooling cycle in response to said frost sensor means for interrupting operation of said fan means and for modifying operation of said temperature controlled means to produce the electric control signal corresponding to a heating cycle thereby utilizing components of said temperature controller for producing an electric control signal required to effect a defrost cycle.

Other objects and advantages will become apparent as this disclosure proceeds to describe the invention with reference to the drawing in which:

FIGURE 3 is a second control network embodying a first modified form of the invention for controlling the refrigeration system of FIGURE 1; and FIGURE 4 is a third control network embodying a second modified form of the invention for controlling the refrigeration system of FIGURE 1.

Figure 1:
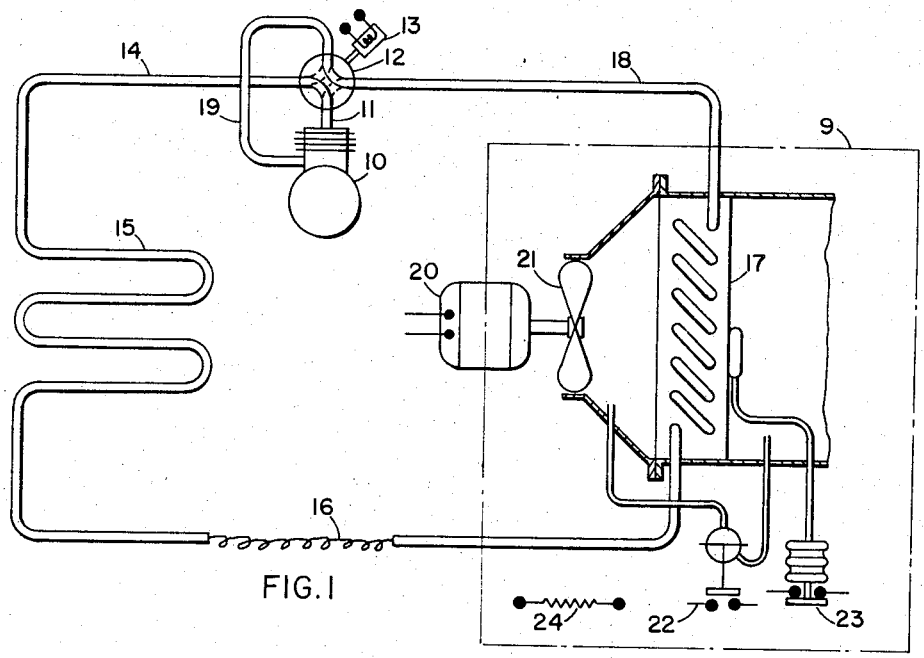
FIGURE 1 is a schematic of a refrigeration system to which the invention may be applied.

Referring more particularly to FIGURE 1 there is shown for the purpose of illustrating this invention an air-to-air heat pump employing a refrigeration system operable under the reverse cycle principle. In apparatus of this type a first heat exchanger 15 is located outside the conditioned space 9 usually in the ambient and a second heat exchanger 17 is located within the conditioned space 9 such as the cargo space of a refrigerated truck. Compressor 10 discharges relatively hot gaseous refrigerant through discharge line 11 to the reversing means 12, preferably, a four-way reversing valve, which is employed for the purpose of reversing refrigerant flow through a portion of the system in order to obtain the desired heating and cooling effects. From the reversing means 12, controlled by the operation of the solenoid 13 in a manner later described, the hot gaseous refrigerant flows during cooling cycle operation through line 14 to outdoor heat exchanger 15 wherein condensation of the gaseous refrigerant occurs as ambient air is passed over the surface of the outdoor heat exchanger 15 such as by a fan (not shown).

The condensed liquid refrigerant flows from heat exchanger 15 through suitable throttling means 16, which may be a capillary tube as shown, or expansion valve means as are well known to those skilled in the art. To indoor heat exchanger 17, serving as an evaporator during the cooling cycle. The throttling means provides the requisite pressure drop between the heat exchangers in the refrigeration system.

In indoor heat exchanger 17, refrigerant is vaporized as heat is extracted from the stream of air delivered over the indoor heat exchanger by fan 21. Vaporous refrigerant so formed flows through line 18 to reversing valve 12 from whence the refrigerant flows through suction line 19 back to compressor 10 to complete the refrigerant flow circuit.

Fan 21 may be driven by suitable drive mechanism, for example electric motor 20.

To heat the area conditioned by indoor heat exchanger 17 the reversing valve 12 is actuated to place line 18 in communication with discharge line 11. Under these circumstances heat from the hot gaseous refrigerant flowing into heat exchanger 17 is rejected to the air delivered by fan 21 to the conditioned space. The rejection of heat from the refrigerant converts the gaseous refrigerant to liquid refrigerant which flows through throttling means 16 to outdoor heat exchanger 15, which now functions as an evaporator. The vaporous refrigerant formed in outdoor heat exchanger 15 as a result of heat transfer between the refrigerant and the ambient air flows to the reversing valve 12 via line 14 into suction line 19 back to the compressor 10.

During operation of the heat pump on the cooling cycle frost may acculate on the fins of heat exchanger 17 which decreases the efficiency of the heat transfer surface. Periodically it is therefore necessary to defrost heat exchanger 17. In the instant example this is done by operating the refrigeration system on the heating cycle whereby heat exchanger 17 is heated by the hot gaseous refrigerant from compressor 10. Also fan 21 is de-activated to reduce the amount of warm air that might otherwise be discharged from heat exchanger 17 thereby retaining the heat at heat exchanger 17 with minimum warming of the conditioned space. This defrost cycle is initiated by closure of pressure differential switch 22 which is arranged to be responsive to the pressure differential across heat exchanger 17. Thus as the frost accumulates on heat exchanger 17 the pressure differential across the exchanger on the air side increases to close switch 22 and initiate the defrost cycle. The defrost cycle is terminated by thermostatic switch 23 arranged to open upon a sufficiently heat heat exchanger temperature to insure that the heat exchanger has been adequately defrosted to restore the heat transferring efficiency of the unit.

The conditioned space 9 may also be in heat transfer relationship with a temperature sensing element such as a resistor 24 having either a positive or negative coefficient of resistance with respect to temperature. The heat pump may operate on either of the heating or cooling cycles according to the dictates of the temperature sensor element 24 to maintain substantially uniform temperature in the conditioned space 9.

Figure 2:
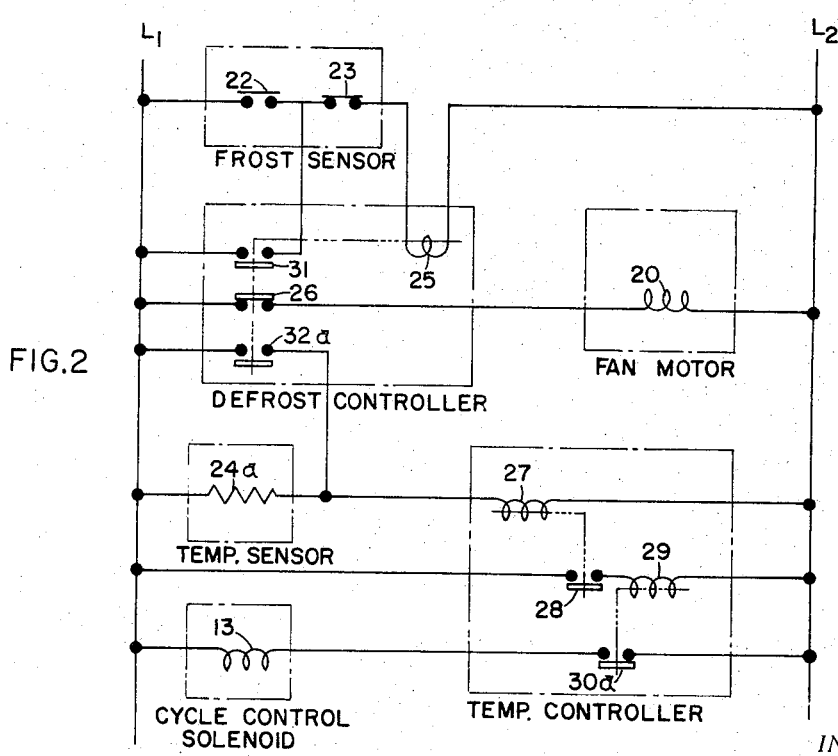
FIGURE 2 is a first control network embodying the invention for controlling the refrigeration system of FIGURE 1.

Each of FIGURES 2, 3 and 4 show separate electric control networks for controlling the cycle of operation of the heat pump of FIGURE 1. In each a suitable source of electric current (not shown) is adapted to supply current via lines $L_1$ and $L_2$. Throughout FIGURES 2, 3 and 4 identical reference numerals have been used to identify identical elements and similar numerals followed by a letter have been used to identify similar elements serving similar functions.

*Figure 2*

The control network of FIGURE 2 includes a first circuit serially connecting pressure differential switch 22, thermostatic switch 23, and relay 25; a second circuit serially connecting fan motor 20 and switch 26; a third circuit serially connecting resistor 24a corresponding to resistor 24 of FIGURE 1 and relay 27; a fourth circuit serially connecting switch 28 and relay 29; and a fifth circuit serially connecting cycle control solenoid 13 and switch 30a corresponding to switch 30 of FIGURE 1. In addition switch 31 is connected to shunt pressure differential switch 22 and switch 32a is connected to shunt resistor 24a.

Switches 26, 31 and 32a are each operated by relay 25, switch 26 being normally closed and switches 31 and 32 being normally open when relay 25 is not energized. Switch 28 is operated by relay 27 and is normally open when relay 27 is de-energized. Switch 30a is operated by relay 29 and is normally open when relay 29 is de-energized. Resistor 24a has a positive coefficient of resistance with respect to temperature.

Assume compressor 10 and fan motor 20 are operating. When the temperature in conditioned space 9 and thus the temperature of resistor 24a passes below a predetermined value, the resistance of resistor 24a falls below a predetermined value thereby energizing relay 27 sufficiently to close switch 28 which in turn energizes relay 29 to close switch 30a which sends a control signal current through solenoid 13 to move reversing valve 12 to the heating position whereby hot gaseous refrigerant is delivered via gas line 18 to heat exchanger 17. The air passed over heat exchanger 17 is warmed thereby warming the conditioned space 9.

As the temperature in the conditioned space and thus the temperature of resistor 24a increases above a predetermined value, the resistance of resistor 24a increases above a predetermined value thereby opening switch 28 of relay 27 which in turn opens switch 30a of relay 29 to interrupt the control signal to solenoid 13 whereupon the system is moved to a cooling cycle. Thus the system will alternately heat and cool the conditioned space according to the dictates of the temperature sensor 24a.

During the cooling cycle frost may accumulate on heat exchanger 17 thereby reducing its efficiency in cooling space 9. As the frost accumulates it will partially block the air flow over the heat exchanger 17 and cause the pressure differential across the heat exchanger to increase. When the pressure differential reaches a predetermined value, pressure differential switch 22 closes thereby energizing defrost relay 25 which in turn closes switches 31 and 32a and opens switch 26. The opening of switch 26 deactivates fan 21 by interrupting the current to fan motor 20. It will be appreciated that switch 26 may equally well be used to declutch an electromagnetic clutch in the drive to fan 21 from any motivating means.

Closure of switch 31 permits the defrost relay 25 to remain energized after deactivation of fan 20 which causes the pressure differential switch 22 to open.

Closure of switch 32a shunting resistor 24a effectively decreases the resistance of resistor 24a to zero thereby causing relay 27 to be energized to close switch 28 which in turn energizes relay 29 to close switch 30a to send a control signal current through solenoid 13 for moving reversing valve 12 to the heating position. Hot gaseous refrigerant then flows directly to heat exchanger 17 causing it to be warmed to melt the frost therefrom. When the heat exchanger 17 becomes sufficiently warm to indicate adequate defrosting, temperature responsive switch 23 opens thereby de-energizing the defrost relay 25 whereby the cooling cycle is resumed and the fan 20 is again activated by closure of switch 26.

Thus it will be appreciated that by this arrangement the defrost control acting through the temperature controller provides the necessary control signal for solenoid 13 to effect a heating cycle for defrost. This is accomplished via single switch 32a without the necessity of isolating the temperature controller from solenoid 13.

Figure 3

The operation of the control circuit of FIGURE 3 is generally similar to that of FIGURE 2. However, it will be noted that the above mentioned third circuit now includes a normally closed switch 32b of relay 25 in series with temperature sensor resistor 24b and that the switch 30b of relay 29 is normally closed. A normally closed switch 30b is used as the action of temperature sensor resistor 24b is negative. That is, the resistance of resistor 24b varies inversely with temperature.

Thus when the temperature of the conditioned space and resistor 24b increases, the resistance of resistor 24b decreases thereby energizing relay 27 closing switch 28 energizing relay 29 and opening switch 30b to interrupt the control current signal to solenoid 13 causing the system to cool. Upon the temperature of conditioned space 9 falling below a predetermined value, the reverse action takes place.

When the defrost relay 25 is energized, switch 32b is opened thereby effectively increasing the resistance of resistor 24b to infinitely causing the temperature controller to close switch 30b for actuating solenoid 13 to the heating cycle.

Figure 4

The operation of the control circuit of FIGURE 4 is generally similar to that of FIGURE 3. However, it will be noted that the above mentioned fourth circuit or amplifier circuit includes the normally closed switch 32c in series therewith. Switch 32c is operated by defrost relay 25. Resistor 24c has a negative coefficient similar to that of resistor 24b and switch 30c is of the normally closed type similar to that of 30b of FIGURE 3.

When the defrost relay 25 is energized, switch 32c is opened thereby interrupting the fourth circuit de-energizing relay 29 and closing switch 30c thereby sending a control current signal to solenoid 13 for operation on the heating cycle.

Thus I have disclosed three embodiments wherein the defrost control utilizes components of the temperature controller to produce a control signal required to effect heating of heat exchanger 17 for defrost purposes. It will be noted that in each embodiment no additional switch or contact is required to isolate the temperature controller from the cycle reversing solenoid.

The disclosure of these embodiments has been merely exemplary and it is fully contemplated that the refrigeration circuit may be arranged to produce heating and cooling in other ways than by reversing the flow of refrigerant therein. Further it is fully contemplated that the temperature controller and/or defrost controller may employ electronic devices other than the simple relays which have been illustrated for ease of understanding the invention.

Having thus described in detail the preferred exemplary embodiments of my invention, I contemplate that many changes may be made without departing from the scope or spirit of my invention and I accordingly desire to be limited only by the following claims.

I claim:

1. A refrigeration system operable in cooling and heating cycles to selectively cool and heat a conditioned space comprising a refrigerant compressor, a first refrigerant gas line, a first heat exchanger, a refrigerant liquid line including refrigerant throttling means, a second heat exchanger, and a second refrigerant gas line respectively serially connected in a closed refrigerant circuit; fan means for passing air from said conditioned space in heat exchange relation with said second heat exchanger; valve means having a first position for delivering liquid refrigerant to said second heat exchanger and a second position for delivering hot gaseous refrigerant to said second heat exchanger for respectively operating said refrigeration system on a cooling cycle and a heating cycle; an electromagnetic operator means drivingly connected to said valve means for moving said valve means to said second position upon receiving an electric control signal; frost sensor means for sensing the presence of frost on said second heat exchanger; temperature sensor means for sensing the temperature of said conditioned space; temperature controller means responsive to said temperature sensor means for selecting the heating cycle of operation if the temperature sensed passes below a predetermined value and the cooling cycle of operation if the temperature sensed passes above a predetermined value and for producing and sending an electric control signal to said electromagnetic operator means when the heating cycle of operation is selected; defrost control means operable during the cooling cycle in response to said frost sensor means for interrupting operation of said fan means and for modifying operation of said temperature controller means to produce the electric control signal corresponding to a heating cycle thereby utilizing components of said temperature controller for producing an electric control signal required to effect a defrost cycle.

2. The apparatus as defined by claim 1 wherein said temperature sensor means is an electric resistor having a resistance which varies with temperature.

3. The apparatus as defined by claim 2 wherein said resistance varies inversely with temperature and said defrost control means includes a switch in series with said resistor which is opened during the defrost cycle thereby modifying operation of said temperature controller means to produce an electric control signal corresponding to a heating cycle.

4. The apparatus as defined by claim 2 wherein said resistance varies directly with temperature and said defrost control means includes a switch in parallel with said resistor which is closed during the defrost cycle thereby modifying operation of said temperature controller means to produce an electric control signal corresponding to a heating cycle.

5. The apparatus as defined by claim 1 wherein said temperature controller includes means for amplifying an electric signal derived from said temperature sensor means and for producing an amplified signal for controlling said electromagnetic operator means, and wherein said defrost control means includes a switch means which when actuated for defrost cycle modifies the operation of said amplifier to cause said temperature controller to produce and deliver to said electromagnetic operator an electric control signal corresponding to the heating cycle of operation.

6. A refrigeration system operable in cooling and heating cycles to selectively cool and heat a conditioned space comprising a refrigerant compressor, a first refrigerant gas line, a first heat exchanger, a refrigerant liquid line including refrigerant throttling means, a second heat exchanger, and a second refrigerant gas line respectively serially connected in a closed refrigerant circuit; fan means for passing air from said conditioned space in heat exchange relation with said second heat exchanger; valve means having a first position for delivering liquid refrigerant to said second heat exchanger and a second position for delivering hot gaseous refrigerant to said second heat exchanger for respectively operating said refrigeration system on a cooling cycle and a heating cycle; an electromagnetic operator means drivingly connected to said valve means for moving said valve means to said second position upon receiving an electric control signal; a first circuit including a frost responsive switch means responsive to the excessive accumulation of frost on said second heat exchanger and a defrost relay, a second circuit including a switch operated by said defrost relay and an electromagnetic means for operating said fan means whereby said defrost relay interrupts operation of said fan means in response to the actuation of said frost responsive switch means; temperature sensor means for sensing the temperature of said conditioned space; a temperautre controller means responsive to said temperature sensor means for selecting the heating cycle of operation if the temperature sensed passes below a predetermined value and the cooling cycle of operation if the temperature sensed passes above a predetermined value and for producing and sending an electric control signal to said electromagnetic operator means when the heating cycle of operation is selected; a second switch operated by said defrost relay arranged to modify operation of said temperature controller to produce an electric control signal corresponding to the heating cycle when said frost responsive switch means indicates excessive frost accumulation thereby utilizing components of said temperature controller for producing an electric control signal required to effect a defrost cycle.

7. The apparatus as defined by claim 6 wherein said temperature responsive sensor is an electric resistor having a resistance which varies inversely with temperature disposed in a third circuit including said second switch, said second switch arranged to open during the defrost cycle.

8. The apparatus as defined by claim 6 wherein said temperature responsive sensor is an electric resistor having a resistance which varies directly with temperature and said second switch is disposed in parallel relation therewith and arranged to close during the defrost cycle.

References Cited

UNITED STATES PATENTS 2,975,611 3/1961 Pietsch _____ 62—140 X
3,107,499 10/1963 Jokela _____ 62—140

ROBERT A. O'LEARY, *Primary Examiner.*

W. E. WAYNER, *Assistant Examiner.*